UNITED STATES PATENT OFFICE.

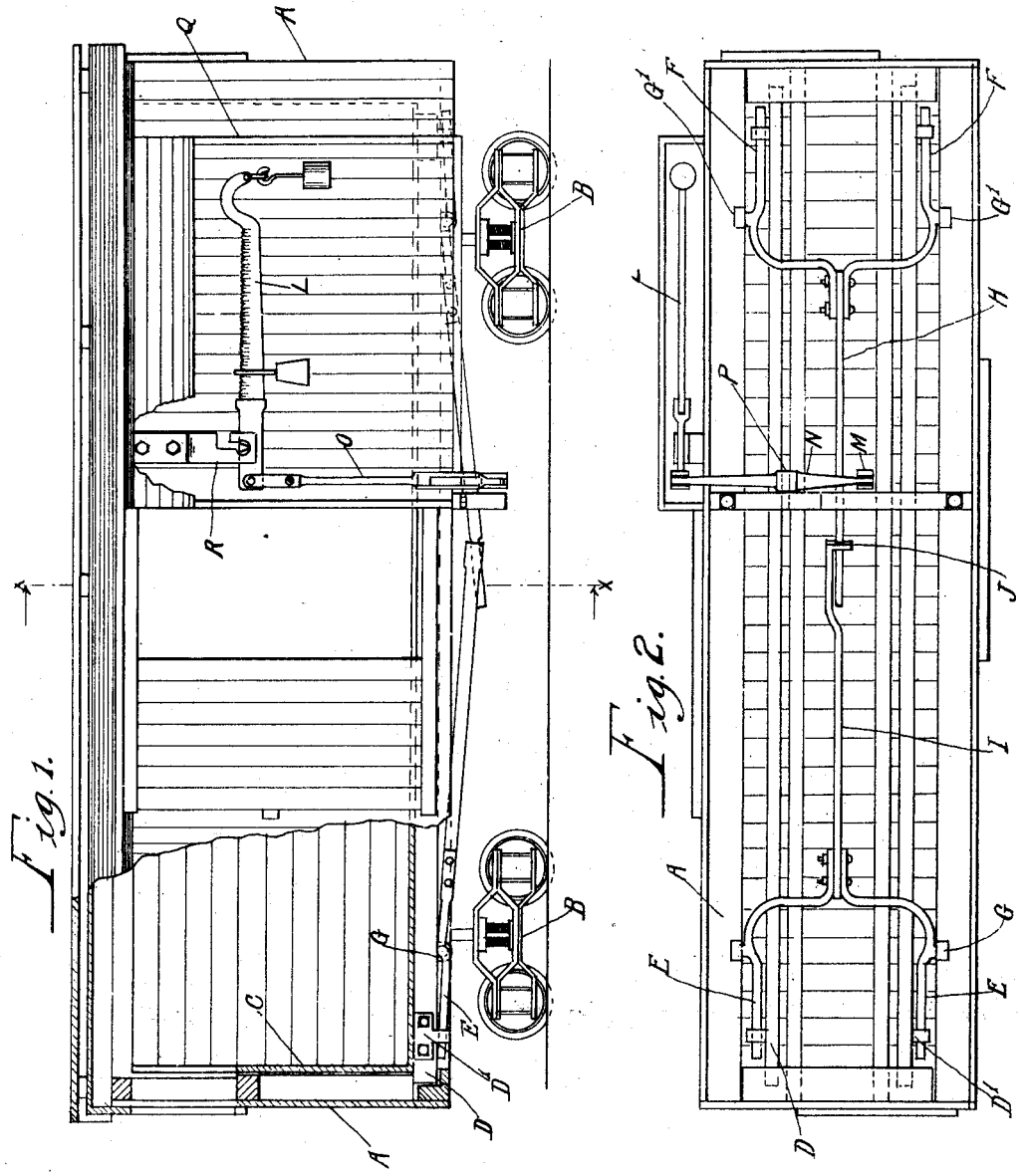

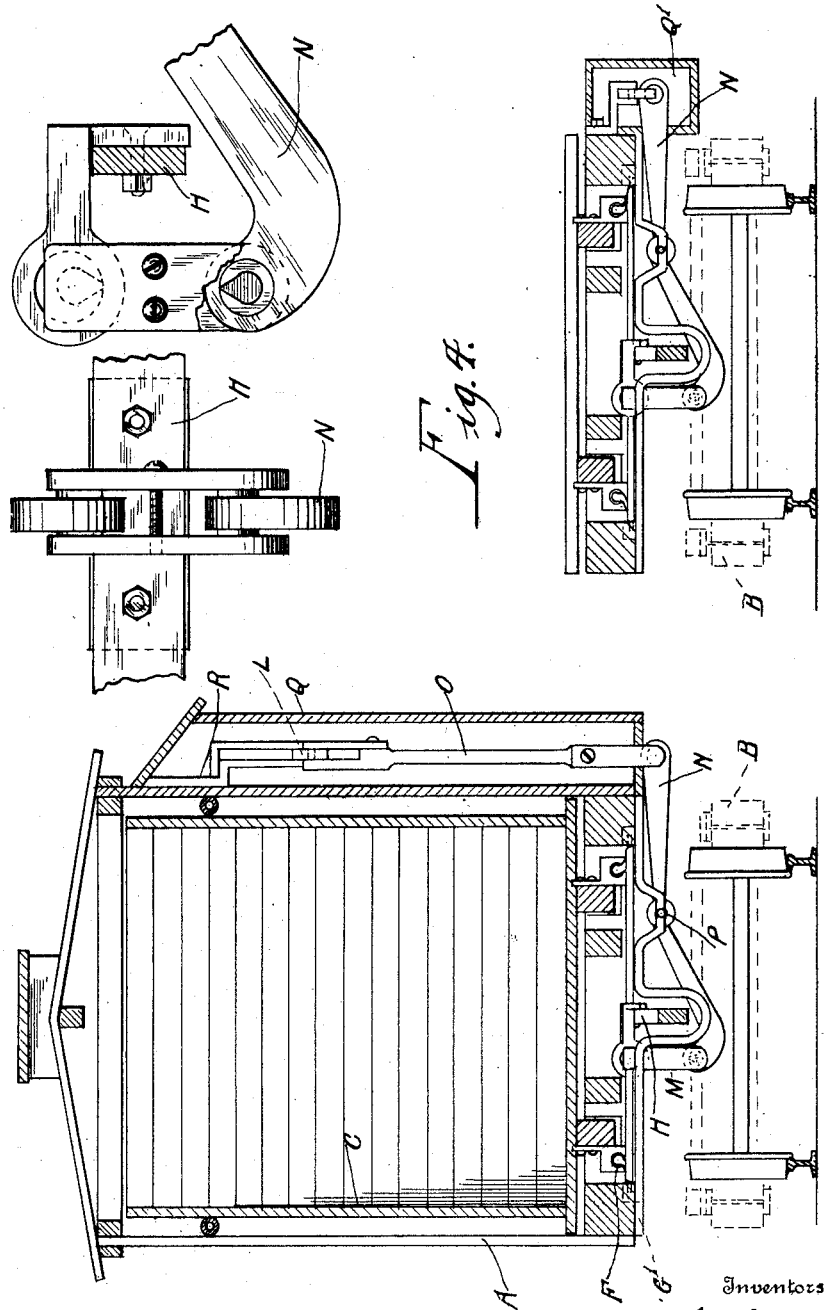

JOHN MALENSHECK AND FREDRICH KACHEWSKI, OF WEST ALLIS, WISCONSIN.

WEIGHING APPARATUS FOR PORTABLE CARS.

977,891.   Specification of Letters Patent.   Patented Dec. 6, 1910.

Application filed June 14, 1909. Serial No. 502,038.

*To all whom it may concern:*

Be it known that we, JOHN MALENSHECK and FREDRICH KACHEWSKI, citizens of the United States, residing at West Allis, county of Milwaukee, and State of Wisconsin, have invented new and useful Improvements in Weighing Apparatus for Portable Cars, of which the following is a specification.

Our invention relates to improvements in weighing apparatus for portable cars.

The object of our invention is to provide means for weighing the contents of a car without weighing the body of the car, the car bodies being usually made of wood and varying greatly in weight with variations in weather conditions.

A further object of our invention is to provide improved mechanism for ascertaining the weight of the contents of a car whether wholly or partially loaded and regardless of the distribution of the load.

In the following description, reference is had to the accompanying drawings, in which—

Figure 1 is a side elevation of a railway car with its walls partially broken away at one end to show the interior chamber and with the outer wall of the scale box removed at the other end. Fig. 2 is a view of the car body as seen from the under side, showing the load supporting levers and the transmitting connections for actuating the scale bar, the box in which the latter is located being shown in section. Fig. 3 is a transverse sectional view, drawn on line $x$—$x$ of Fig. 1. Fig. 4 is a similar view showing a modified form of construction designed particularly for use on flat cars. Fig. 5 is a detail sectional view of the connection between load bearing lever arm H and the transverse lever N. Fig. 6 is an end view of the same.

Like parts are identified by the same reference characters throughout the several views.

The car body A is supported from the trucks B in the usual manner. Within the body, however, a movable load receiver, such for example as the box C, may be employed, which box is mounted upon beams D, which support the box C from load bearing levers underneath the body of the car. One of these levers comprises yoke arms E connected with a bar I and pivoted at G to the body A of the car and loosely connected at D' with the beams D. The other of these levers comprises the yoke arms F and bar H pivoted at G' to the body of the car. The bars H and I extend longitudinally underneath the car and are loosely connected with each other at J, whereby a vertical movement of either bar H or I is transmitted to the other and this vertical movement is also transmitted from the bar H to the scale beam L through the link M, lever N and link O, the latter being pivoted at its upper end to the scale beam L and at its lower end to the lever N. The lever N is fulcrumed at P to the car body A. The scale beam L, when used upon a box car, may be conveniently located in a housing Q at the side of the car, the beam being fulcrumed upon a hanger R.

The operation of the device will be readily understood from the above description. A load applied to the left hand end of the box C will depress the outer ends of the yoke arms E, causing them to swing upon the pivoted fulcrum bearings G to impart an upward movement to the bars I and H, this movement being transmitted through the lever N to exert a downward pull upon the link O, thus lifting the weighted end of the scale beam L. Similarly a load placed on the right hand end of the box C will tend to depress the outer ends of the yoke arms F, causing them to swing upon the pivots G' and lifting the bars H and I.

Where the device is applied to a flat car, the scale beam L may be located in a box Q' underneath the body A of the car, and the lever N connected therewith, the operation being the same as that above described as used for a box car.

Owing to the fact that the load levers are loosely connected with each other at J, it is obvious that both will be actuated simultaneously and equally regardless of the position of the load in the box C.

The box C will, of course, be of known and uniform weight, preferably composed of sheet metal and the exact weight of the contents may therefore be readily determined.

We are aware of the fact that attempts have heretofore been made to provide means for ascertaining the weight of the contents of a railway car by mounting the body of the car upon scale beams, but we believe that in all such cases, the body of the car has been directly supported upon such beams and it was therefore impossible to ascertain the weight of the contents, since the weight of the car body itself could not be known unless it had been weighed when empty, immediately prior to placing the contents therein. It is frequently desirable, however, to not only weigh the contents at the loading station, but to again weigh them at the point of delivery, particularly where grains or other materials liable to loss in transit are being transported. We believe that we are the first to discover that results of sufficient accuracy to be useful cannot be attained where the receptacle which is weighed with the material is exposed to the weather and liable to variations in weight according to weather conditions. In the ordinary box cars, such variations are considerable and are sufficiently so to make any ordinary weighing apparatus unreliable for the purposes above stated. But by combining with the car body an interior box which receives the contents of the car and is protected from the weather, and by supporting this box upon scale beams carried by the exterior car body, we are enabled to secure accurate results, whereby the weight of the contents of a car may be determined either at the time of loading or at the time of delivery, or at any intermediate point. It is in fact often desirable to weigh the contents at one or more intermediate points, in order to locate the point at which fraudulent withdrawals are being attempted.

Having thus described our invention, what we claim as new, and desire to secure by Letters Patent, is—

1. The combination with the body of a portable railway car, of a movable load receiver therein having a floor substantially filling the space between the end and side walls of the body and provided with upwardly extending side and end walls in proximity to the end and side walls of the car body, a set of load bearing levers pivotally connected with the body of the car and loosely connected with each other underneath the central portion of the car body, said levers having arms in supporting connection with the load receiver at their outer ends, a transverse lever pivotally fulcrumed to the body of the car and having one arm loosely connected with one of the load bearing levers, and a scale beam loosely connected with the other arm of said transverse lever.

2. The combination with the body of a portable railway car, of a movable load receiver therein, a set of load bearing levers pivotally connected with the body of the car and having arms in supporting connection with the load receiver at their outer ends, the inner ends of said lever being loosely connected with each other, a transverse lever pivotally fulcrumed to the body of the car and having one arm loosely connected with one of the load bearing levers, and a scale beam loosely connected with the other arm of said transverse lever, said scale beam being mounted in a suitable housing also connected with the body of the car.

3. The combination with the floor of a railway car, of a movable load receiver supported by said floor, a set of load bearing levers having forked ends supported from said car floor by pivotal connections secured to the forked arms at intermediate points, and with the outer ends of said forked arms supporting said load receiver, said levers extending inwardly toward the center of the car, and one of said levers being provided with an apertured arm through which the other lever loosely extends, a transverse lever pivotally fulcrumed to the floor of said car and having its inner end linked to one of said forked levers, a scale beam operatively connected to said transverse lever and a housing supported from said car and inclosing said scale beam.

In testimony whereof we affix our signatures in the presence of two witnesses.

JOHN MALENSHECK.
FREDRICH KACHEWSKI.

Witnesses:
O. R. ERWIN,
LEVERETT C. WHEELER.